United States Patent

[11] 3,593,293

[72] Inventor Bjorn A. Rorholt
Trosterudveien 33, Slemdal; Oslo, Norway
[21] Appl. No 741,592
[22] Filed July 1, 1968
[45] Patented July 13, 1971

[54] REMOTE CONTROL AND DATA LOGGING SYSTEM
11 Claims, 13 Drawing Figs.

[52] U.S. Cl. 340/152, 178/4.1
[51] Int. Cl. H04g 9/00
[50] Field of Search 340/151, 152, 150; 178/4.1, 4.2, 4.3, 2; 179/2 DP, 2 A, 3

[56] References Cited

UNITED STATES PATENTS 2,659,879 11/1953 Pappenfus 178/4.1 X
3,360,777 12/1967 Kolm 179/2 (R)

*Primary Examiner*—Ralph D. Blakeslee
*Attorney*—Chittick, Pfund, Birch, Samuels & Gauthier

ABSTRACT: A data reporting, logging and remote control system utilizing teleprinter code for transmission of orders and reporting information between a control station and one or several outstations.

INVENTOR.
BJØRN A. RØRHOLT
BY
Russell, Dittich & Grund

INVENTOR.
BJØRN A. RØRHOLT
BY
Russell, Chittick & Pfund

STATION CALL SIGN IDENTIFICATION AND STATION OPENING

INVENTOR.
BJØRN A. RØRHOLT
BY
Russell, Lidtleh & Olund

INVENTOR.
BJØRN A. RØRHOLT
BY
Russell, Dittrich & [signature]

PATENTED JUL 13 1971

3,593,293

SHEET 05 OF 12

INVENTOR.
BJØRN A. RØRHOLT
BY
Russell, Chittick & Pfund

OUT STATION REPORTING FIG. 7

INVENTOR.
BJØRN A. RØRHOLT
BY
Russell, Chittick & Pfund

REMOTE ADDRESS AND CONTROL

INVENTOR.
BJØRN A. RØRHOLT
BY
Russell, Chittick & Pfund

PATENTED JUL 13 1971 3,593,293

SHEET 08 OF 12

INVENTOR.
BJØRN A. RØRHOLT
BY
Russell, Dittrich & Pfund

INVENTOR.
BJØRN A. RØRHOLT
BY
Russell, [signature]

INVENTOR.
BJØRN A. RØRHOLT
BY
Russell, Dittbach & ...

INVENTOR.
BJØRN A. RØRHOLT
BY
Russell, Chittick & Pfund

INVENTOR.
BJØRN A. RØRHOLT
BY
Russell, Dietrich & Yund

REMOTE CONTROL AND DATA LOGGING SYSTEM

CROSS-REFERENCE TO RELATED APPLICATION

The subject matter of the present application is related to the Slow Data Rate Telemetering and Data Logging System described in my copending application Ser. No. 498,015, filed Oct. 19, 1965, now U.S. Pat. No. 3,478,318.

BACKGROUND OF THE INVENTION

The present invention relates to information transmission systems in general and, more particularly, to a remote control and data reporting system employing standard teleprinter code for the transmission of orders and reporting information between a control station and one or more outstations.

The use of telemetering systems for monitoring and controlling remote installations from a central or control station is well known in the art. Generally speaking, the complexity and cost of such telemetering systems are directly related to the information transmission rate required for both the reporting and remote control modes of operation. If the information transmission rate is relatively slow, for instance, a bit duration of the order of 50 to 250 milliseconds, the required bandwidth of the telemetering channel and the frequency pass bands of the transmission, reception and data processing equipment can be reduced significantly with a concomitant reduction not only in the complexity and initial cost of the telemetering equipment, but also in the cost of maintaining the equipment.

In my copending application Ser. No. 498,015, there is described a slow data rate telemetering system in which the telemetered information is handled and processed by conventional, relatively inexpensive teleprinter equipment including perforators, printers and line transmitters. The present invention is an improvement of the slow data rate system and relates primarily to the outstation equipment for reception, processing and transmission of reporting and remote control information.

It is therefore a general object of the present invention to provide a telemetering system for monitoring and controlling remote installations from a control station by the use of teleprinter code.

It is a specific object of the invention to provide an improved information processing apparatus for use at an outstation which responds to and communicates with a control station in teleprinter code.

It is another object of the invention to provide a telemetering system having at least one outstation that is responsive to teleprinter code reporting and remote control orders. It is a feature of the system that selective outstations can be addressed for both reporting and remote control functions without actuating any other outstation. It is another feature of the invention that the system is relatively immune to noise impulses, transients and spurious station call sign signals and remote control orders.

These objects and other objects and features of the invention will best be understood from a detailed description of a preferred embodiment thereof, selected for purposes of illustration, and shown in the accompanying drawings, in which.

Figure 1:
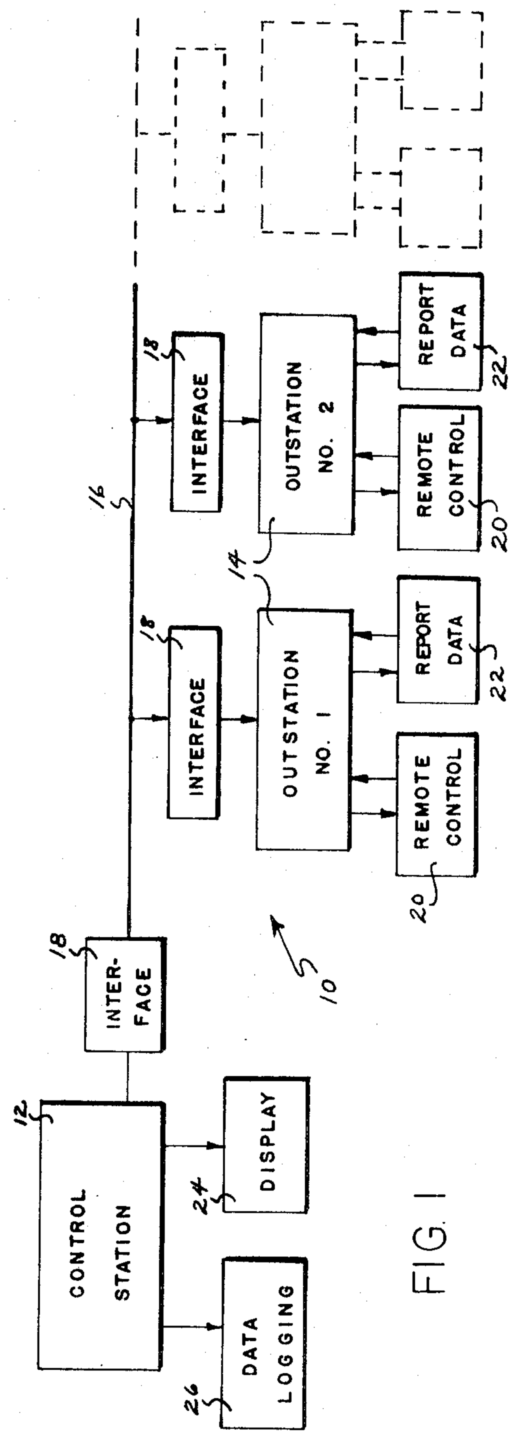
FIG. 1 is a block diagram of the remote control and reporting system showing a control station and two outstations interconnected over a communication channel.

Turning now to the drawings and particularly to FIG. 1 thereof, there is shown in block diagram form a remote control and reporting system constructed in accordance with the present invention and indicated generally by the reference numeral 10. The system comprises a control station 12 and one or more outstations 14 that are connected to the control station on a party line basis over a communication channel 16. Conventional teleprinter equipment is provided at the central station and at each outstation for the transmission and reception of teleprinter impulses over the communication channel. Standard five-bit teleprinter code is employed for transmission of command signals and reporting information between the control station and each outstation.

The remote control and reporting system 10 is basically a simplex or half duplex, two-wire system in which the transmitter of each station is blocked when the receiver is operating and vice versa. Like other teleprinter impulses, the system's command signals and reporting information can be transmitted over various types of communication channels, such as, carrier frequency systems over a radio link or physical pairs. All of the system's stations are interfaced to the communication channel by suitable interfacing equipment 18 that is designed to accommodate either a two-wire or four-wire circuit.

Each outstation has remote control and data reporting facilities 20 and 22, respectively, that will be described hereinafter in greater detail. Preferably, the control station 12 has a display 24 for visual presentation of the control station command signals and the reporting data received from each of the outstations 14. Additionally, the control station can have appropriate data logging equipment 26 for providing a semipermanent or permanent record of the date and time of each control station command signal, the reporting information from each outstation and the remote control orders and acknowledgments thereof by the outstations. Suitable equipment for such data logging is described in my above-mentioned copending application.

Figure 2:
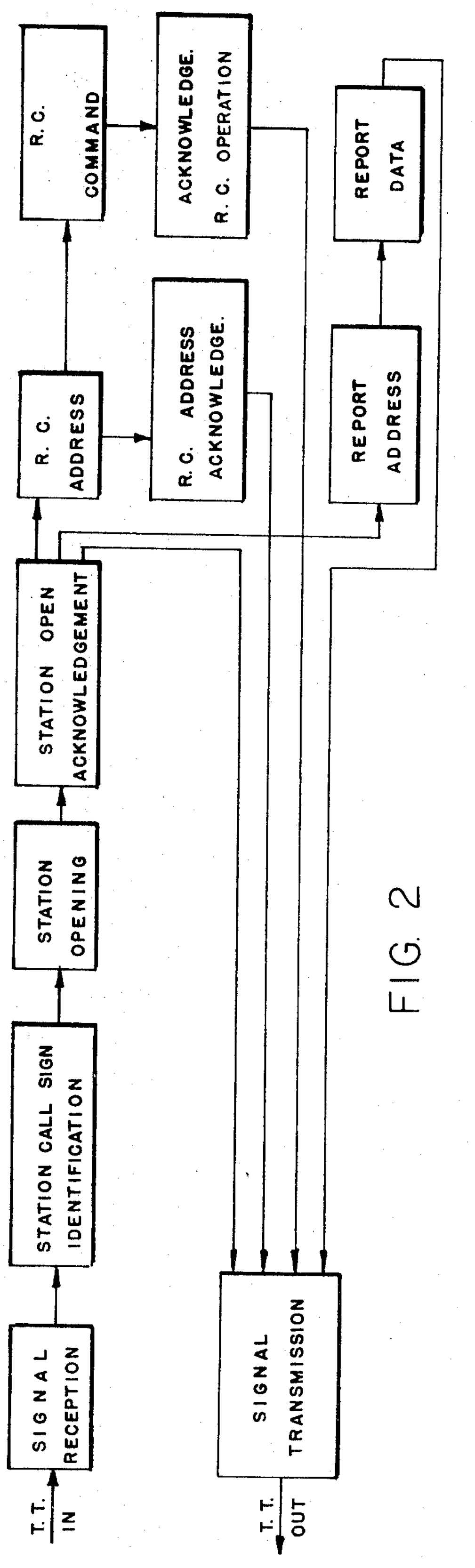
FIG. 2 is a functional block diagram of the information processing circuitry at each outstation.

The overall operation of the outstation signal processing equipment can best be understood by examining the functional block diagram depicted in FIG. 2. In order to select the desired one of a series of outstations connected on a party line basis, each outstation 14 is assigned a unique call sign. The call sign consists of one teleprinter character (one letter) which must be received correctly by the outstation for a programmed number of times in succession in order to open the outstation. The outstation must be opened before it will respond to command signals from the control station. The outstation automatically acknowledges that it is open by transmitting its own call sign back to the control station.

The control station initiates a remote control function at the outstation by transmitting a preselected remote control address signal to the outstation for the particular control function that is to be actuated at the outstation. The remote control address signal consists of bit numbers 1, 2, 4 and 5 of one teleprinter character. Acknowledgment is sent to the control station when the outstation is ready to receive a remote control command for the preselected remote control address. The outstation is thus conditioned to receive the remote control command that will actuate the desired remote control function. The control function is accomplished by altering the third bit of the remote control command signal, for instance:

*T*=*S S S S M* (*S*=space, *M*=mark)

*H*=*S S M S M*

In this example, the remote control function is initiated from the control station by sending the letter *H* to the outstation. This same letter will be returned to the control station as an acknowledgment when the remote control action has been performed by the outstation. The particular remote control function which was actuated by the remote control command can be reversed by transmitting the letter *T* to the outstation.

Interrogation of the outstations for reporting data is achieved by transmitting a common "report" signal to all of the outstations. The reporting function for a particular outstation is initiated by transmitting the station's call sign. After the selected outstation has been opened up, transmission of the common "report" signal will cause the opened outstation to report the desired data.

Having briefly described the overall configuration of the remote control and reporting system 10 and the functions of each outstation 14, I will now discuss in detail the outstation circuitry.

OUTSTATION TELEPRINTER INPUT AND "A" REGISTER

Figure 3:
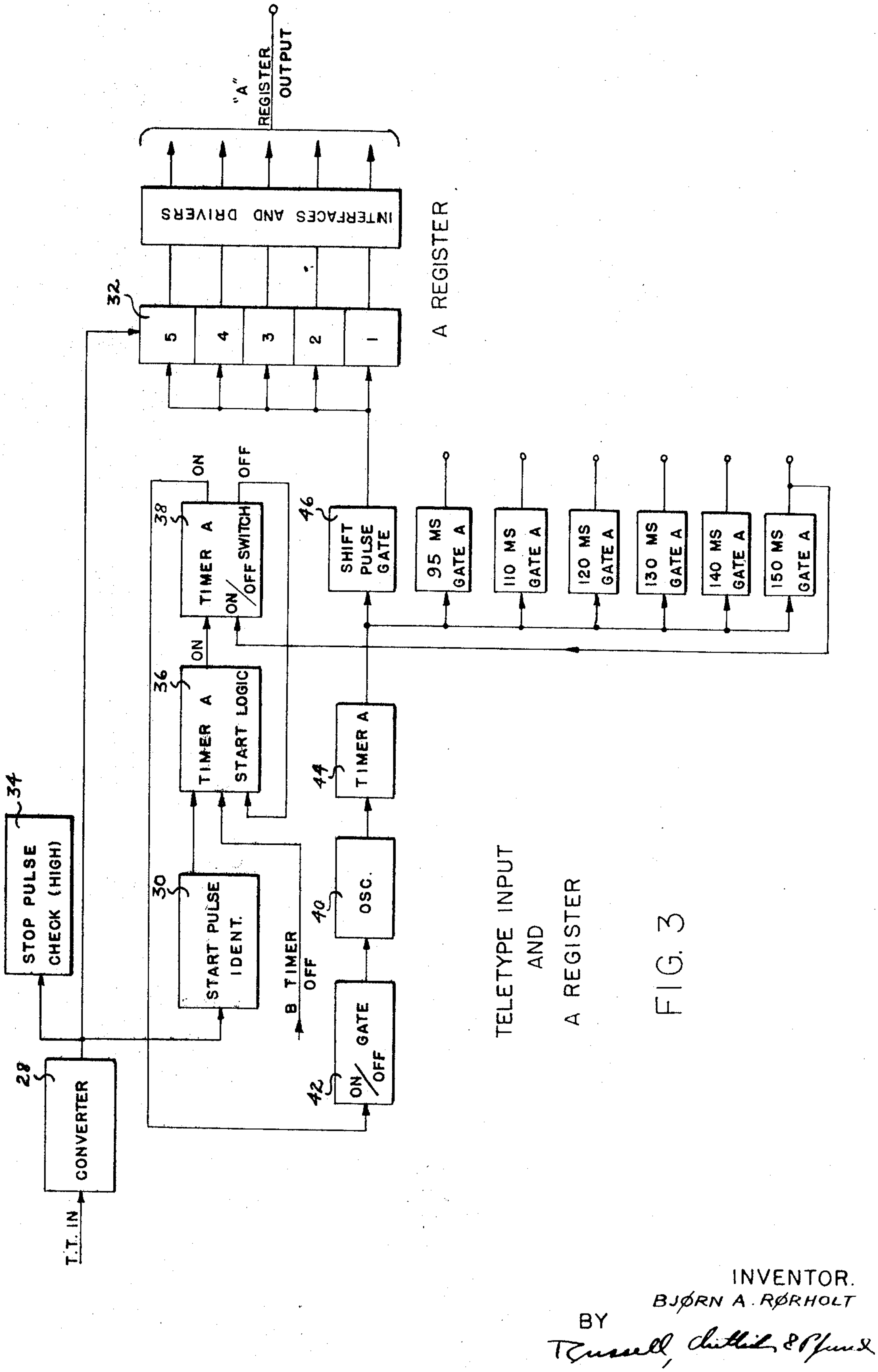
FIG. 3 is a block diagram of the outstation teleprinter signal input circuit, control circuits and the received signal register.

Referring now to FIG. 3, the teleprinter signals from the control station 12 are fed to a converter 28 over the communication channel 16 of the system. The converter 28 smooths any distortion of the received teleprinter signal and reshapes the incoming pulses to form square pulses. Converter 28 can be designed to receive either single or double current impulses depending upon the desired characteristics of the remote control and reporting system. From converter 28, the pulses are sent to a Start Pulse Identification circuit 30, a received signal or "A" Register 32 and a Stop Check Pulse circuit 34.

Figure 9:
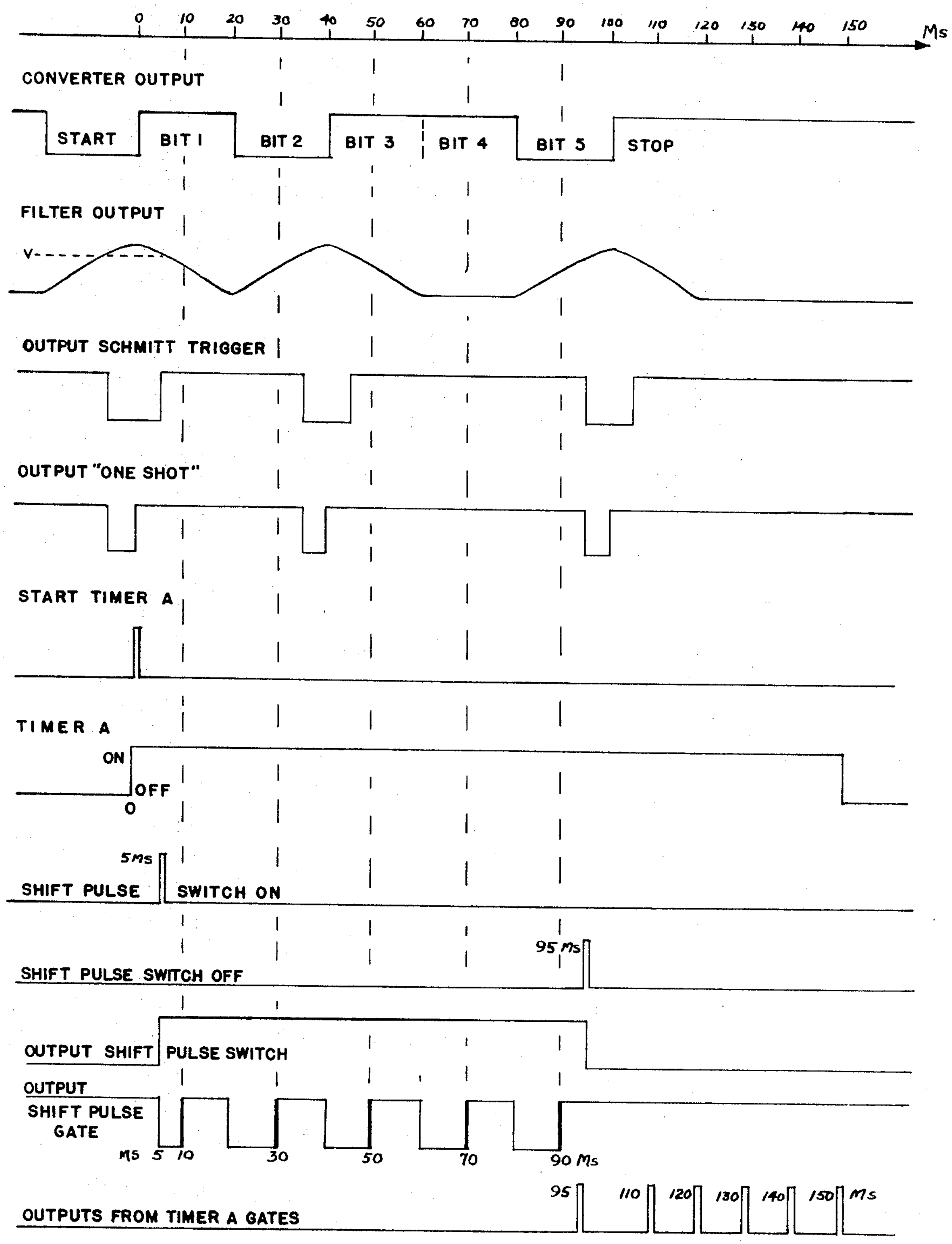
FIG. 9 is a timing diagram of the Timer A Start Logic and Timer A outputs.

The operation of the circuitry illustrated in FIG. 3 can best be understood by examining FIG. 3 in conjunction with the corresponding timing diagram shown in FIG. 9. The validity of the teleprinter signal "Start" pulse is ascertained by the Start Pulse Identification circuit 30 which comprises an integrator, a Schmitt trigger, and a "one-shot" multivibrator (not shown). The 20 millisecond "Start" is integrated by the Start Pulse Ident. circuit integrator. The received "Start" pulse must have a duration of approximately 15 milliseconds in order to allow the output voltage of the integrating filter to reach a firing voltage $v$ (FIG. 9) of the Schmitt trigger. The output pulse from the Schmitt trigger actuates the "one-shot" multivibrator which provides one input to a Timer A Start Logic AND circuit 36. The other inputs to the AND circuit are Timer A ON/OFF switch 38 "OFF" and Timer B ON/OFF switch 40 (FIG. 6) "OFF." If the logical conditions are fulfilled, the Timer A Start Logic 36 will provide an output pulse at the time of the positive going transition of the "one-shot" multivibrator pulse as shown in FIG. 9. This action occurs 20 milliseconds from the beginning of the "Start" pulse. The output from Timer A Start Logic 36 in turn triggers Timer A ON/OFF switch 38 to the ON position 20 milliseconds after the beginning of the "Start" pulse. This will start oscillator 40 via an ON/OFF gate 42. The oscillator pulses, which have a period of 10 milliseconds, are fed to a timer 44 hereinafter referred to as "Timer A." Timer A, together with the associated gates, generates the necessary pulses for the logical functioning of the outstation signal-processing circuits.

If the received "Start" pulse has a duration which is shorter than 15 milliseconds, the pulse will not be accepted by the Start Pulse Ident. circuit 30 as a true "Start" pulse. This arrangement makes the system 10 relatively immune to false starts caused by noise impulses, transients and spurious signals.

Once the oscillator 40 has been started, Timer A generates shift pulses that are taken through a Shift Pulse Gate 46 to Register A. The Shift Pulse Gate 46 is open during the period from 5 to 95 milliseconds measured from the start of oscillator 40 which corresponds to the beginning of the first bit in the incoming teleprinter message. Five shift pulses are generated during this period and they occur in the middle of each bit of incoming signal as shown in the timing diagram of FIG. 9. The processed teleprinter signals from converter 28 are read into Register A bit by bit for each shift pulse with the shift occurring on the positive going edge of the shift pulse.

STATION CALL SIGN IDENTIFICATION AND STATION OPENING

Figure 4:
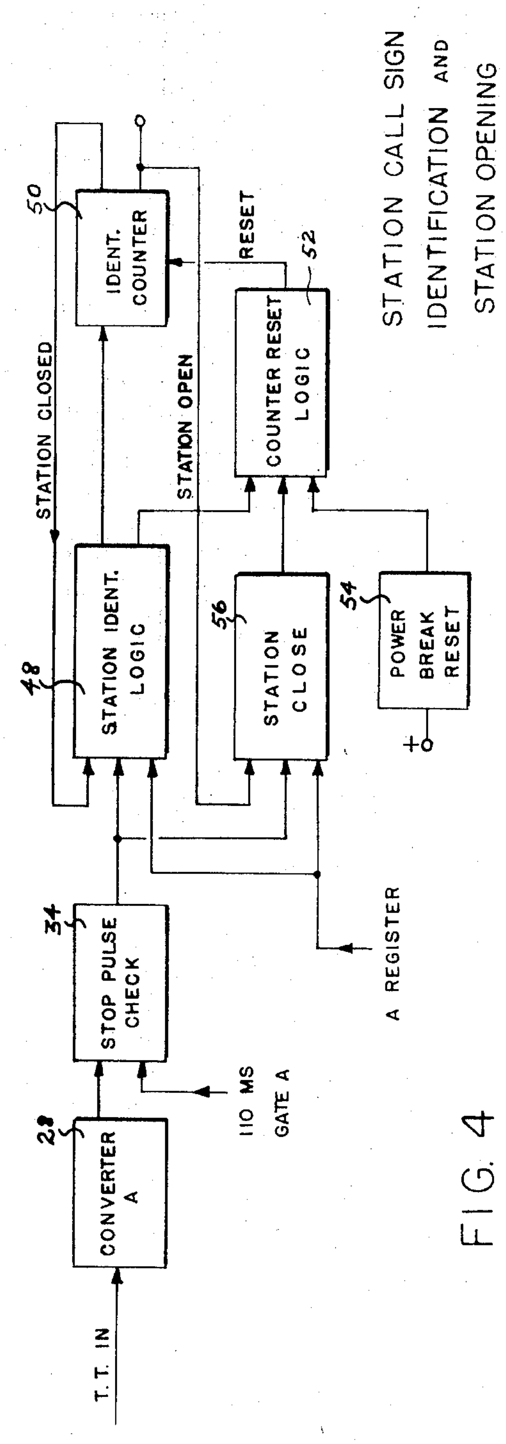
FIG. 4 is a block diagram of the outstation call sign identification and station opening circuits.
Figure 10:
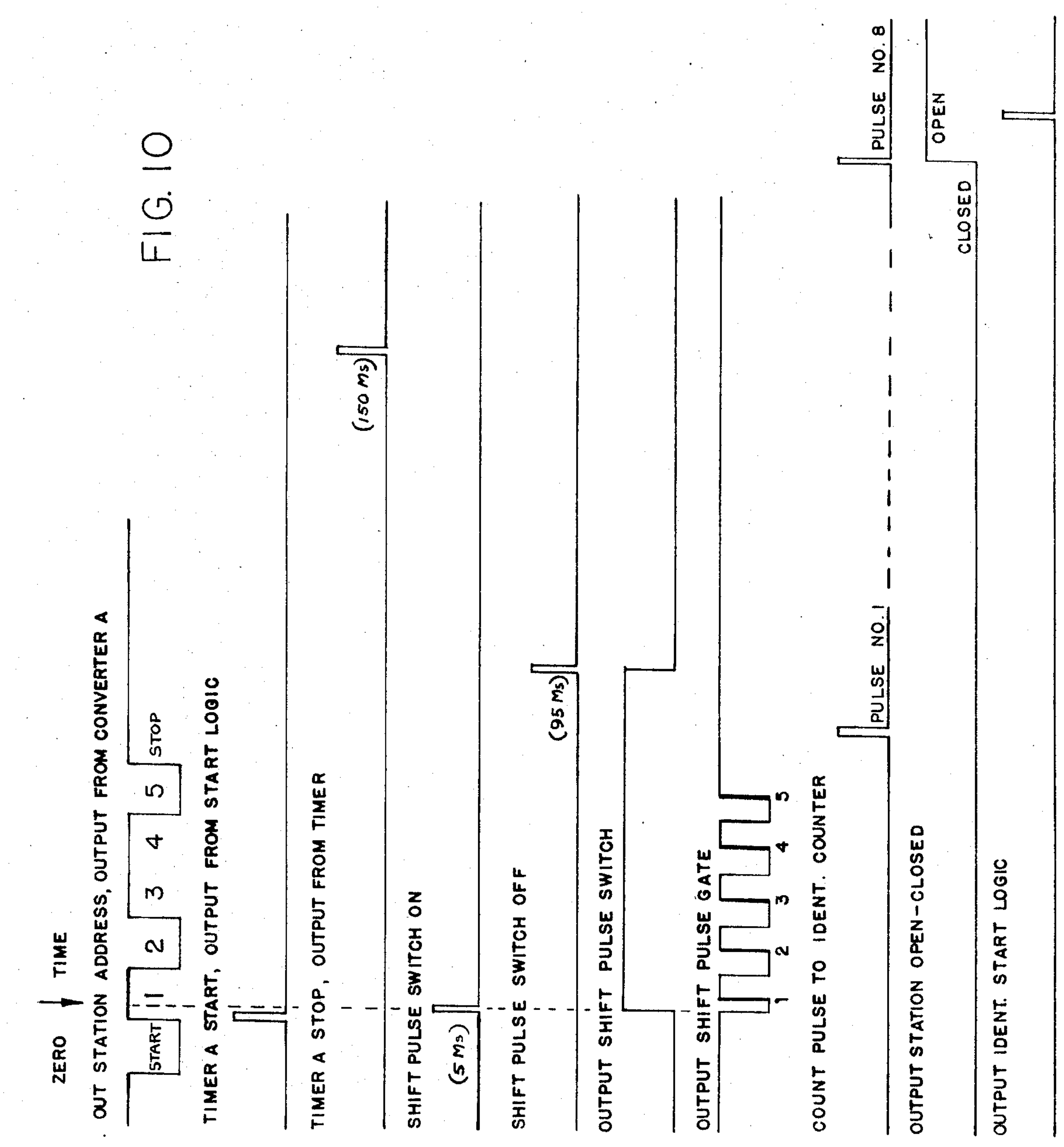
FIG. 10 is a timing diagram of the station opening operation.

The outstation call sign identification and station opening circuitry are shown in FIG. 4 with the corresponding timing diagram illustrated in FIG. 10. The processed teleprinter signals from Converter 28 are fed to the Stop Pulse Check circuit 34 which verifies the authenticity of the received teleprinter "Stop" pulse. If the "Stop" pulse is authentic, the Stop Pulse Check circuit triggers Station Identification Logic 48 at 110 milliseconds after the start of oscillator 40.

The Station Ident. Logic 48 is prewired with the call sign of the particular outstation. If the received teleprinter character in Register A is identical to the station call sign that has been programmed into the Station Ident. Logic and, if the station is closed, the Station Ident. Logic will produce a "count" pulse for an Identification Counter 50. After the reception of a predetermined number of station call signs in succession, the Ident. Counter 50 produces a station "Open" pulse. If the succession of call sign signals is interrupted at any point before the programmed total number of successive call signs is reached, the Ident. Counter is reset by Counter Reset 52 which functions as a Logical OR circuit. In the event of an interruption of the power supply to the outstation, a power break reset 54 will reset the Ident. Counter through the Counter Reset Logic 52 after the power break.

Once the outstation has been opened, the station can be closed at any time by transmitting a predetermined "close" signal to the outstation. This particular signal is prewired into a Station Close circuit 56. If the outstation is "open," and the station "close" signal has been received and fed into the A Register, and if there is a valid "stop" pulse, then at 110 milliseconds after the end of the "Start" pulse for the station "-close" teleprinter signal, the Station Close circuit will trigger the Counter Reset Logic 52.

STATION OPEN VERIFICATION—CALL SIGN TRANSMISSION AND REGISTER "B"

Figure 5:
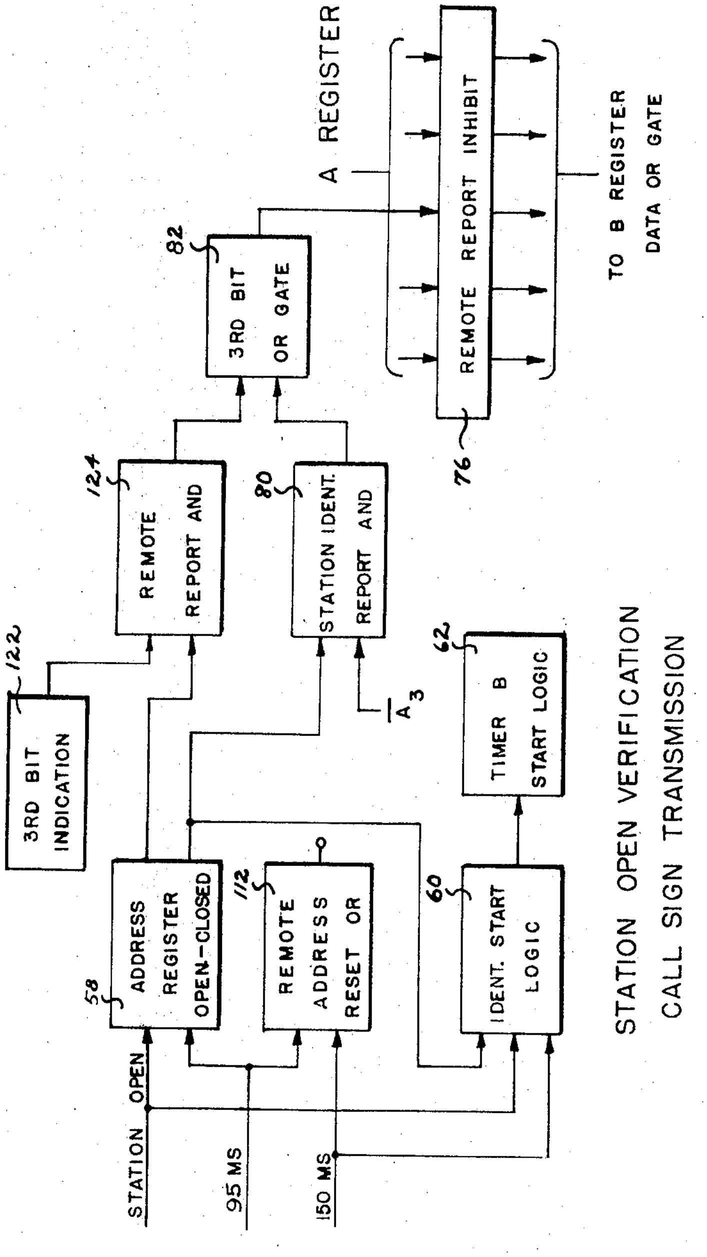
FIG. 5 is a block diagram of the station open verification and call sign transmission circuits.
Figure 11:
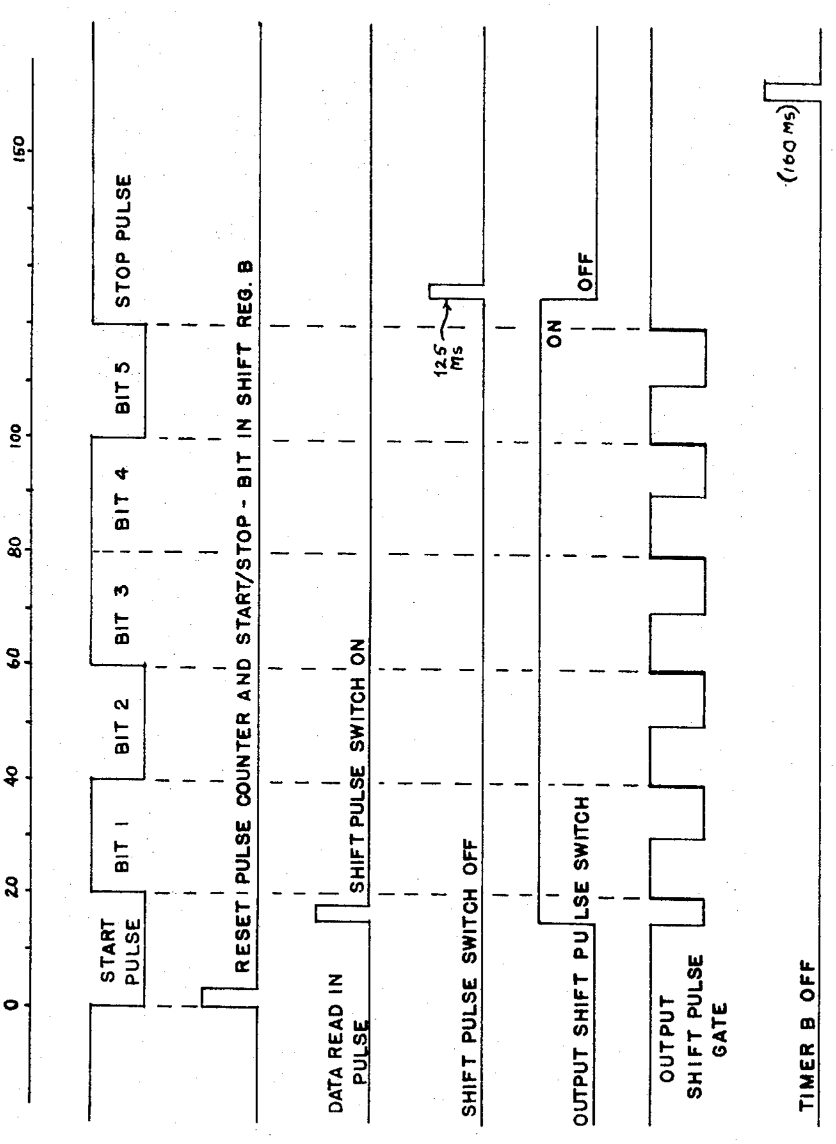
FIG. 11 is a timing diagram of the Timer B circuits.

The outstation acknowledges that it is open and ready to receive orders by transmitting its own call sign back to the control station. This function is performed by the station open verification—call sign transmission circuits depicted in FIGS. 5 and 6. The corresponding timing diagram is shown in FIG. 11. The station "open" signal from the Ident. Counter 50 is fed to an Address Register Open-Closed circuit 58 and an Ident. Start Logic circuit 60. The operation of the Address Register Open-Closed circuit 58 will be discussed below in connection with the remote control function of the outstation.

Figure 6:
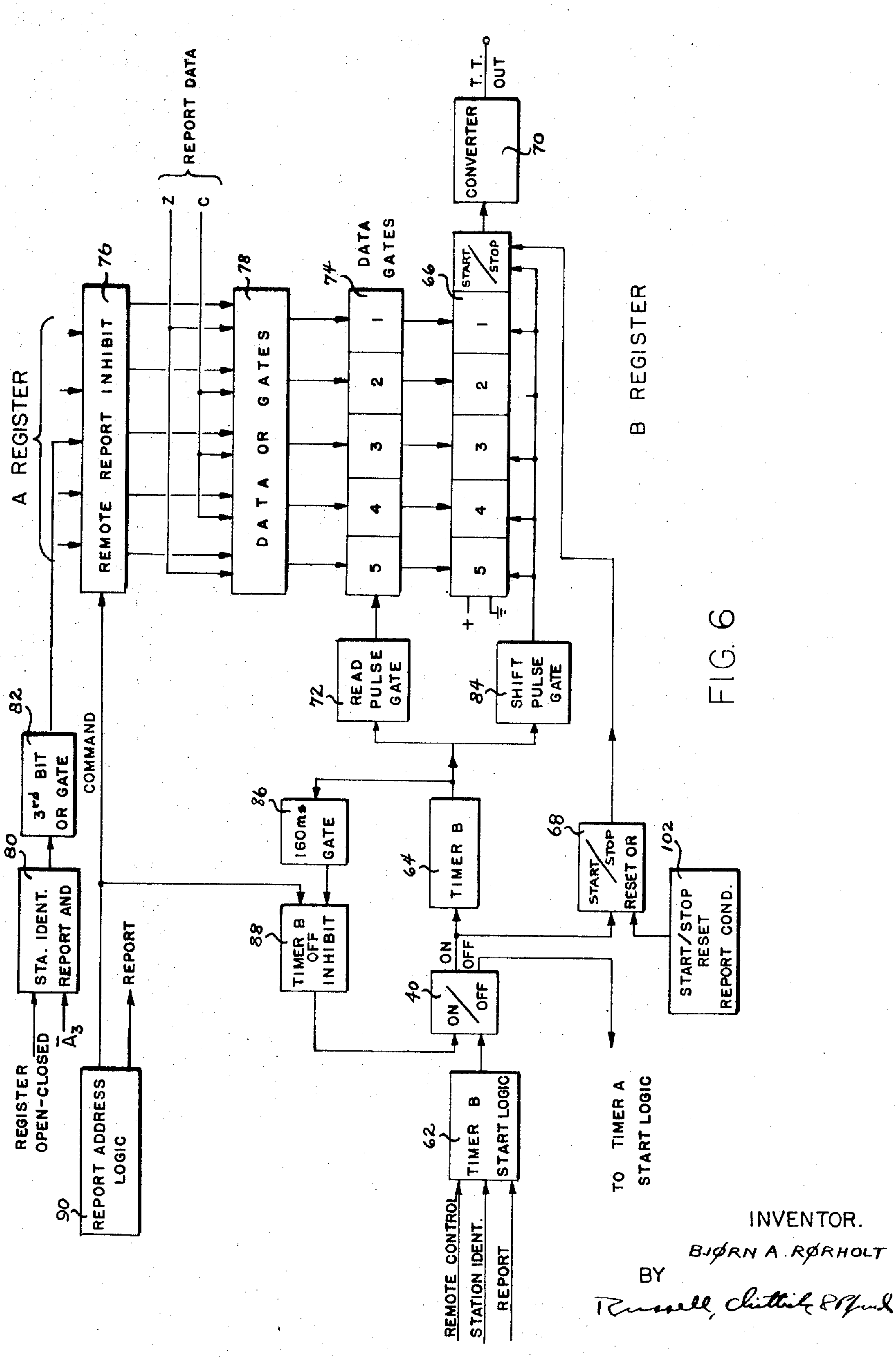
FIG. 6 is a block diagram of the transmitted signal register and the control circuits.

With the station open, the Ident. Start Logic 60 triggers Timer B Start Logic 62 at 150 milliseconds. Referring now to FIG. 6, the output from the Timer B Start Logic turns Timer B ON/OFF switch 40 to the ON position causing a second timer 64, hereinafter referred to as "Timer B," (oscillator not shown) to produce timing impulses for control of a transmitted signal or "B" Register 66. The output from Timer B ON/OFF switch also blocks the Timer A Start Logic 36 and resets Register B Start/Stop element through a Start/Stop Reset Logical OR circuit 68. This action causes a "Start" pulse from the Start/Stop element in Register B to be sent via converter 70 to the control station over the communication link. Fifteen milliseconds after the beginning of the "Start" pulse, Timer B delivers a read pulse through Read Pulse Gate 72 to B Register Data Gates 74.

The outstation call sign that was previously stored in Register A is now read into Register B through the circuit comprising Remote Report Inhibit 76, Data OR Gates 78 and the data gates 74. The third bit of the call sign teleprinter letter that is read into Register B is obtained from the $\overline{A}_3$ output of the third bit of Register A. The $\overline{A}_3$ signal is used for one input to a Station Ident. Report AND gate 80. The other input is provided by the Register Open-Closed bistable 58. The output of AND gate 80 is applied to a third bit OR Gate 82 that is connected to the Remote Report Inhibit 76.

The contents of Register B are shifted serially out of the Register by shift pulses from Timer B delivered through Shift Pulse Gate 84. Each shift pulse has a duration of 20 milliseconds with the bit shift occurring on the positive-going edges of the pulse as shown in the Timing diagram of FIG. 11. The contents of the B Register are shifted out via converter 70 to the communication link 16. After the sixth shift pulse, the Shift pulse gate 84 is closed at 125 milliseconds. Timer B is turned off at 160 milliseconds by its own pulse through a 160 millisecond Gate 86 and Timer B OFF Inhibit AND gate 88. The other input to the Inhibit AND gate 88 is provided by the "Command" output from Remote Address Logic 90. The function of the Remote Address Logic circuit 90 will be discussed below in connection with the outstation reporting cycle. However, for the moment, it is sufficient to note that the "Command" output is present whenever the outstation is not in the "Report" mode.

The outstation 14 having acknowledged that it is "Open" by transmitting its own call sign back to the control station, is now ready to receive either a "report" order or a remote control command.

OUTSTATION REPORTING CYCLE

Each outstation is designed to report a predetermined number of binary data. For purposes of illustration, the outstation circuitry discussed herein is capable of reporting the binary value of 15 bits. It will be appreciated that the system 10 is capable of being expanded to handle additional reporting data generated at any particular outstation. The reporting cycle is initiated by transmitting a common "report" signal to all outstations. However, only the outstation which was previously opened will respond to the common "report" signal.

Figure 7:
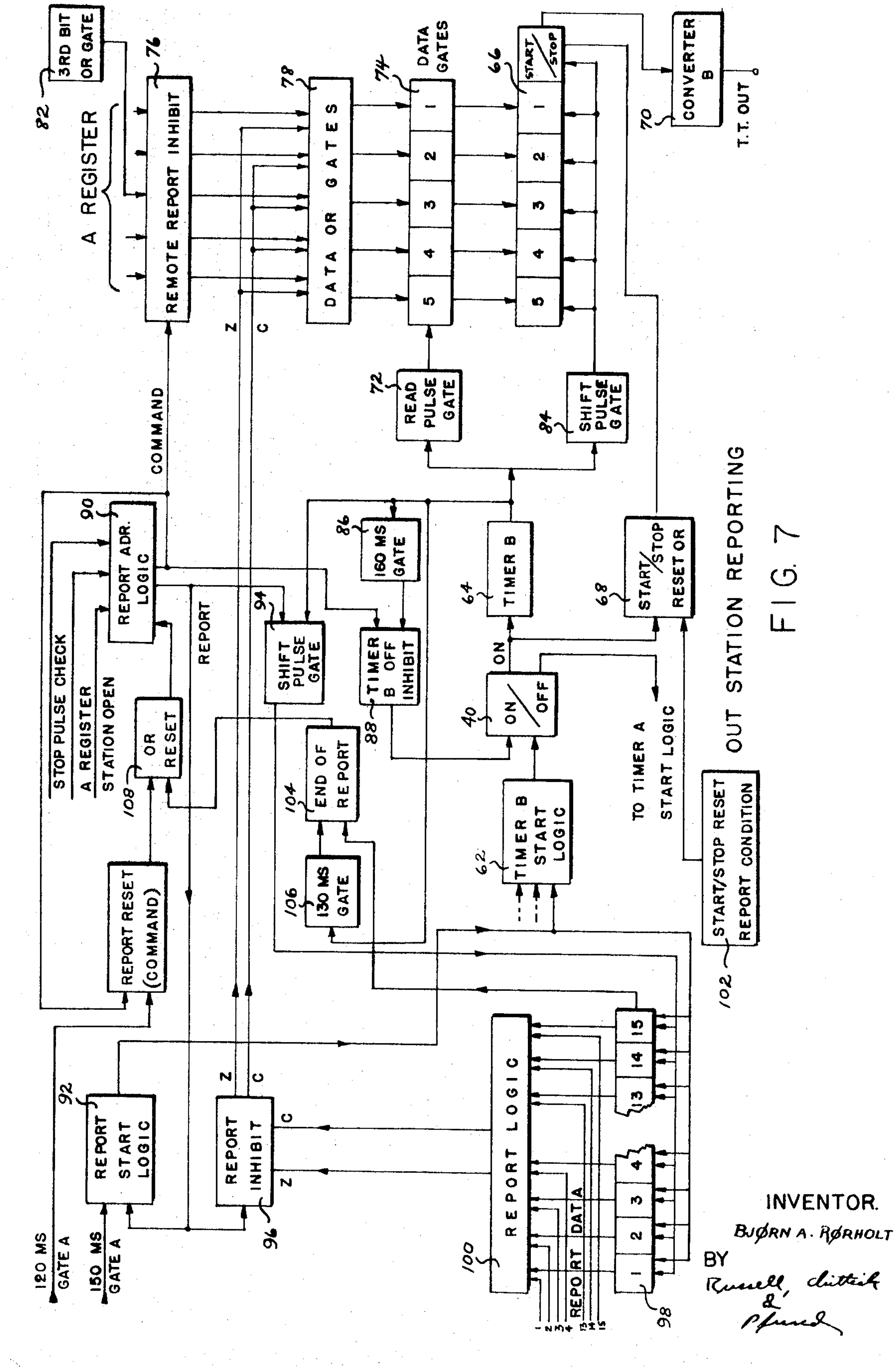
FIG. 7 is a block diagram of the outstation reporting circuits.
Figure 12:
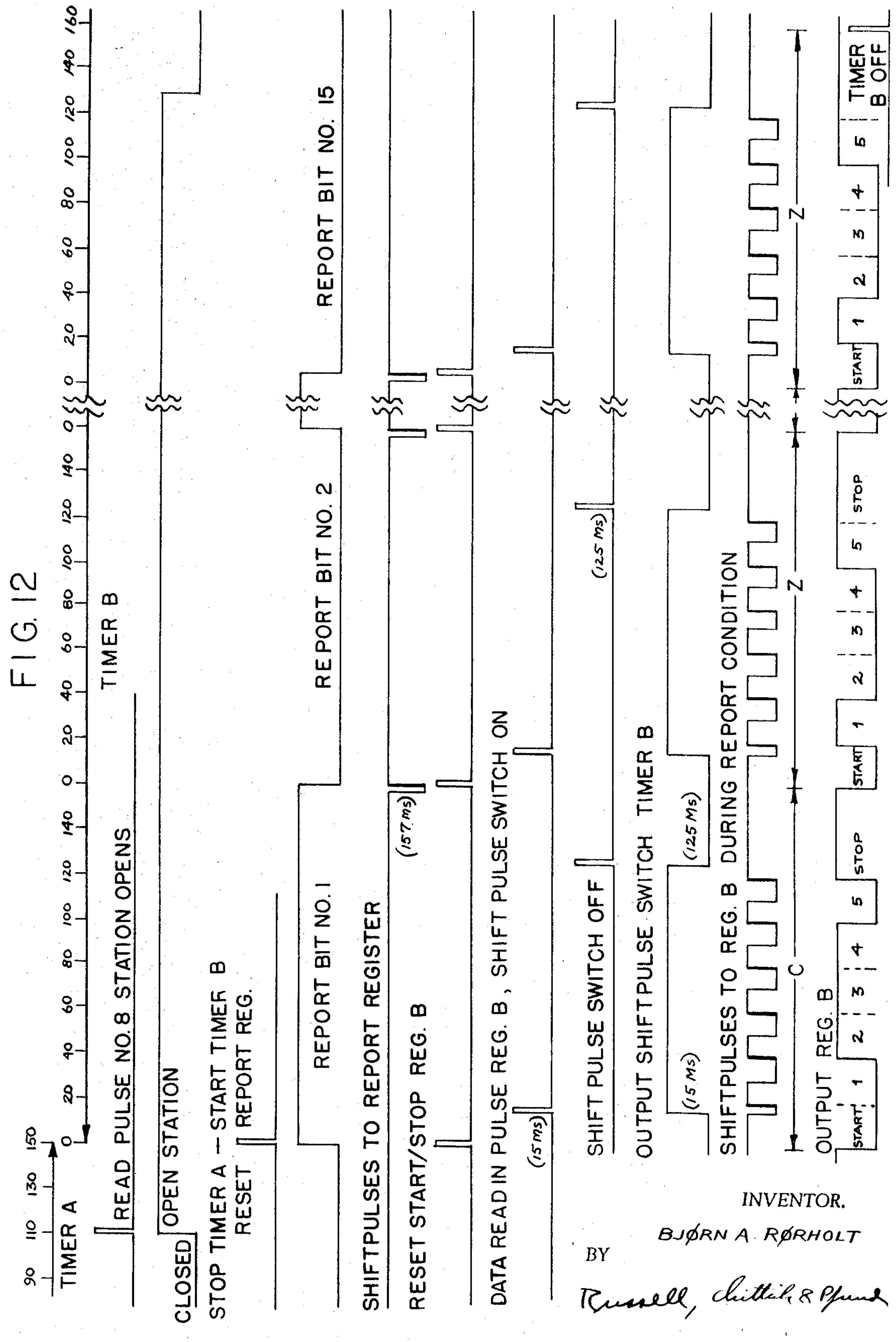
FIG. 12 is a timing diagram of the outstation reporting cycle.

The outstation reporting circuitry and the corresponding timing diagram are shown in FIGS. 7 and 12. The reporting signal or order from the control station is read into the outstation A Register and fed to the Report Address Logic 90 which is prewired for a particular reporting signal. If the reporting signal and the prewiring are identical and, if the station is open, then at the Stop Pulse Check time of 110 milliseconds, the Report Address Logic 90 will provide an output to Report Start Logic 92, Timer B Shift Pulse gate 94 and Report Inhibit 96. At 150 milliseconds, the Report Start Logic triggers Timer B Start Logic 62 which in turn starts Timer B as described above.

The output from the Report Start Logic also resets a 15-bit Report Register 98 that is used to commutate the binary reporting data on lines No. 1—15 to Report Logic 100.

The Report Logic circuit 100 converts the binary reporting data into one or the other of two preselected teleprinter letters, such as C and Z, depending upon the binary value of the input data. The C or Z outputs from the Report Logic are normally blocked by the Report Inhibit circuit 96. When the outstation is in the "Report" mode, the Inhibit circuit is opened by the output from the Report Address Logic 90 at 110 milliseconds measured with respect to the start of Timer A. With the Report Inhibit 96 open and Timer B running, the "mark-space" teleprinter code pulses representing the letters C or Z are fed from the Report Logic to the data OR gates 78 and then read into the B Register. It should be noted that during the reporting sequence, the contents of the A Register are blocked from the data OR gates 78 by the Remote Report Inhibit circuit 76 which is open only when the Report Address Logic 90 is in the "Command" mode.

The C or Z reporting information is shifted out of the B Register in serial form to converter 70 and then to the teleprinter communication channel. Since the transmission of the reporting data will take longer than 160 milliseconds, timer B must continue running until the transmission of the report message is completed. This is accomplished by the Timer B Off Inhibit AND circuit 88. When the outstation is operating in the "Report" mode, the Report Address Logic 90 does not provide the necessary "Command" signal to actuate the Timer B Off Inhibit AND circuit at 160 milliseconds. Therefore, Timer B will continue to run until the Report Address Logic is reset to the "Command" mode at the end of the full reporting cycle.

At the end of each individual teleprinter letter C or Z in the report message, the B Register Start/Stop element is reset by the Start/Stop Reset OR gate 68. This gate is operated by a Start/Stop Reset AND gate 102 at 160 milliseconds measured with respect to the beginning of the "Start" pulse for each teleprinter letter. When the 15th teleprinter letter is shifted out of the report register 98, an output is provided for one input to an End of Report AND gate 104. Looking at FIG. 12, it can be seen that by 120 milliseconds the 15th bit of the report message has been shifted out of the B Register. At 130 milliseconds, the second input to the End of Report AND gate 104 is provided by a 130-millisecond gate 106. The output of the AND gate 104 is applied to a Reset OR gate 108 that resets the Report Address Logic 90 to the "Command" mode. Thus, at 160 milliseconds, the Timer B OFF Inhibit AND gate 88 provides an output which triggers the Timer B ON/OFF Switch 40 to OFF.

REMOTE CONTROL

Figure 8:
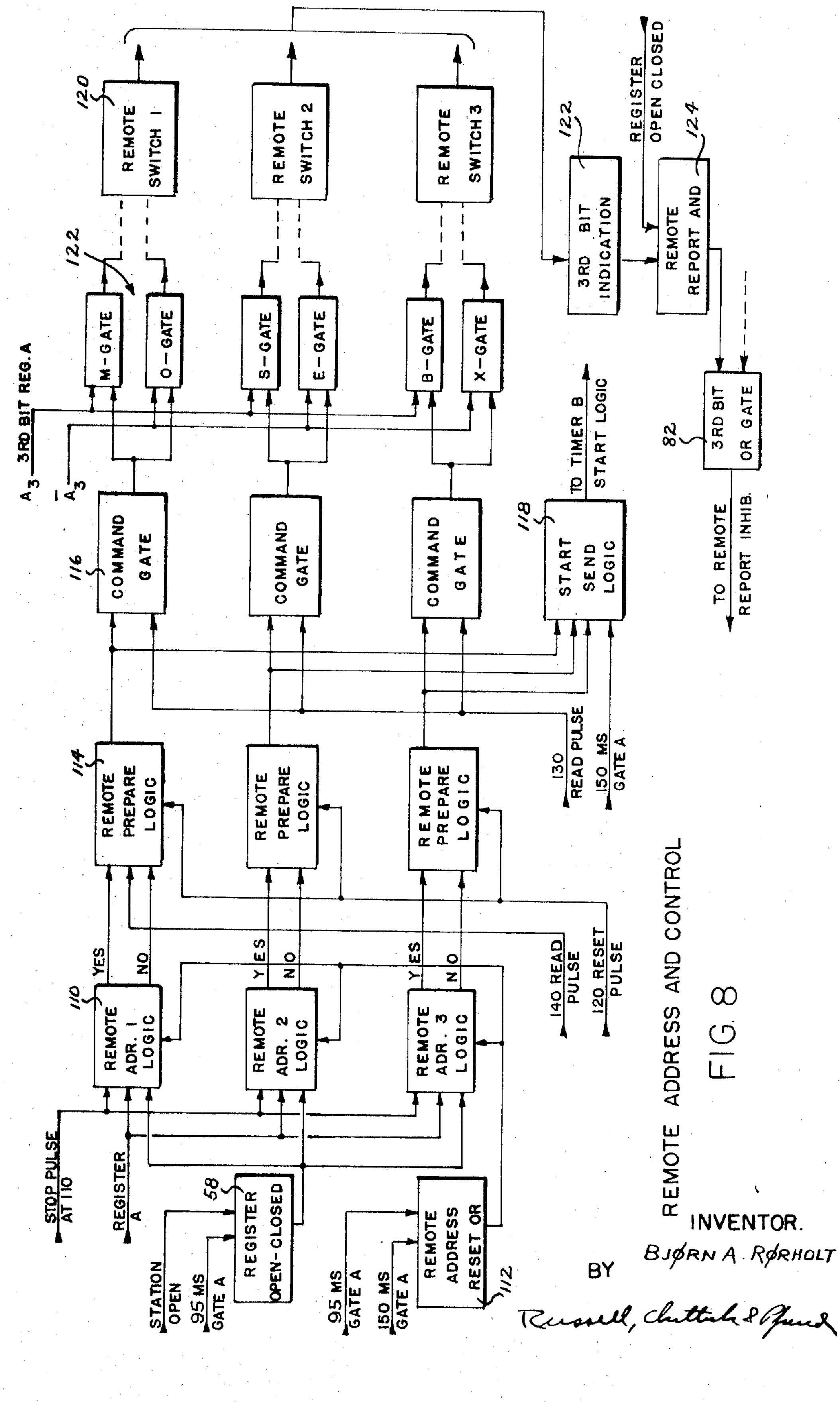
FIG. 8 is a block diagram of the outstation remote address and control circuits.
Figure 13:
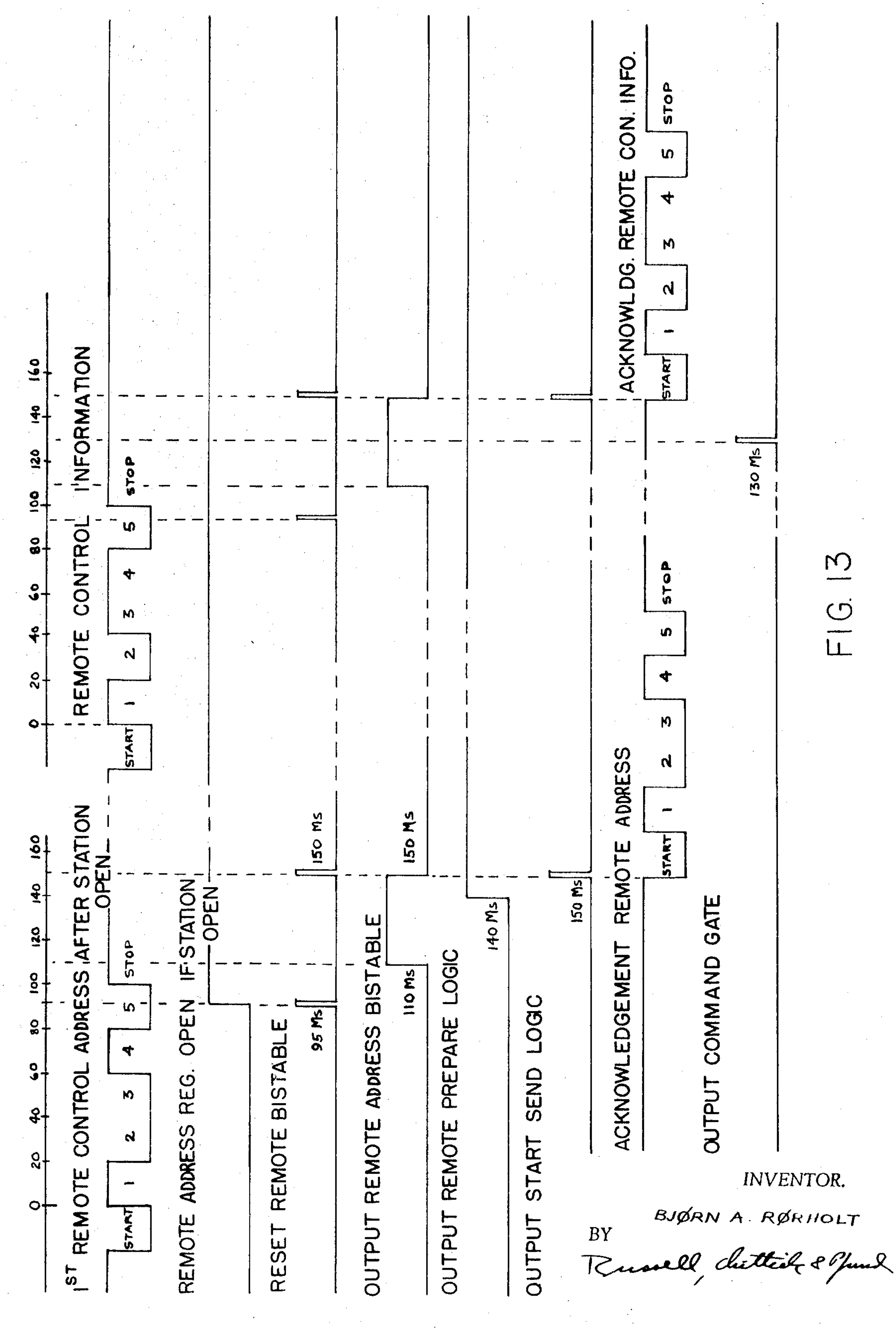
FIG. 13 is a timing diagram of the outstation remote control sequence.

The remote control portion of the remote control and data reporting system 10 is illustrated in FIG. 8. The associated timing diagram is depicted in FIG. 13. In order to carry out a remote control action, the control station transmits a single teleprinter character that corresponds to the address of the remote control function. The remote control address for each remote control function consists of the first, second, fourth and fifth bits of the character. Consequently, each address corresponds to two teleprinter characters which differ only in the third bit.

The outstation is first opened up as described above and then the appropriate remote control address signal is transmitted to the outstation. After processing in converter 28, the address signal is read into Register A by the shift pulses from Timer A. At 95 milliseconds, the Address Register Open-Closed circuit 58 opens all of the Remote Address Registers 110 which at the same time are reset by a Remote Address Reset OR gate 112. Each Register is prewired for a particular address signal. The address signal in the A Register is read into the Remote Address Registers 110 by the output signal from the Stop pulse check 34 at 110 milliseconds. If the address signal coincides with the prewiring of one of the Remote Address Registers, a "Yes" output is provided to a corresponding bistable Remote Prepare Logic circuit 114. At 140 milliseconds, the "Yes" output is read into the Remote Prepare Logic 114 which in turn produces an output for a corresponding Command AND Gate 116 and a remote control Start Send Logic circuit 118.

Receipt of the remote control address signal is acknowledged by sending the signal back to the control station. The Start Send Logic 118 is used to perform this function. A pulse from the 150 milliseconds Gate A of Timer A causes the Start Send Logic to trigger the Timer B Start Logic 62. The address signal in the A Register is read into the B Register and then serially shifted out of the B Register to converter 70 and the teleprinter communication channel.

Erroneous remote control operation is substantially eliminated by requiring receipt of two successive correct remote control address signals before the remote control function can be performed at the outstation. Each one of the Remote Address Registers 110 is reset at 150 milliseconds by the Remote Address Reset OR gate 112. If the second address signal is incorrect, the Address Register will provide a "No" output to the Remote Prepare Logic 114 and the Prepare Logic will be reset at 120 milliseconds. Therefore no output from the Remote Prepare Logic will be read into the Command Gate 116 by the 130-millisecond read pulse. However, if the second address signal is correct, the output from the Remote Prepare Logic will be read into the Command Gate at 130 milliseconds. The Command Gate produces a "Command" pulse for a corresponding Remote Switch 120 through an associated gating circuit indicated generally as 122.

If the remote control order is to switch one of the Remote Switches 120 to the "ON" position, this is accomplished when the third bit of the character sent from the control station is a mark. For instance, Remote Switch No. 1 is controlled by the M and O Gates. Transmission of the letter M prepares the M-Gate and when the "Command" pulse appears, the M-Gate will give an output to Remote Switch No. 1. If the control station sends the letter O which has a space for the third bit, but is otherwise equal to the letter M, the O-Gate is prepared and gives an output when the "Command" pulse appears. Similar pairs of letters S and E and B and X are used to control Remote Switches Nos. 2 and 3, respectively.

Completion of the remote control operation is indicated by the binary value of the third bit in the signal transmitted back to the control station. The third bit signal is obtained from the actuated Remote Switch via a third bit Indication OR Gate 122, Remote Report AND gate 124, and the third bit OR Gate 82. The third bit signal is read into the B Register together with bits 1, 2, 4 and 5 from the A Register. The combined signal is then transmitted back to the control station.

Having described in detail a preferred embodiment of my invention, what I claim and desire to secure by Letters Patent of the United States is:

1. A teleprinter remote control and data reporting system comprising:

a control station having means for transmitting and receiving teleprinter signals;

at least one outstation having means for transmitting and receiving teleprinter signals, said receiving means including means responsive to a selected teleprinter call character for opening said outstation to a command signal from said control station whenever said selected teleprinter call character is received by said outstation for a predetermined number of times in succession, and said transmitting means including means for transmitting a predetermined teleprinter acknowledgment character whenever said selected teleprinter call character has been received by said outstation for said predetermined number of turns in succession;

and, a communication channel connecting said control station and said outstation.

2. The system of claim 1 further characterized by said outstation including means operative whenever said outstation is open for transmitting reporting date in teleprinter code to said control station in response to a report command teleprinter signal from said control station.

3. The system of claim 2 wherein said reporting data transmitting means comprises:

report shift register means for commutating the report data from a plurality of data sources;

control means for said report shift register means;

means for producing a predetermined teleprinter character in parallel form whenever the binary value of the reporting data is "1" and a different predetermined teleprinter character whenever the binary value is "0";

transmitted signal shift register means for converting the parallel teleprinter character from said character-producing means into serial form for transmission over said communication channel; and control means for said transmitted signal shift register means.

4. The system of claim 1 further characterized by means operative whenever said outstation is open for actuating a selected remote control function in response to a remote control teleprinter command signal from said control station.

5. The system of claim 4 further characterized by means for acknowledging receipt of said remote control command signal before said remote control function is actuated.

6. The system of claim 5 further characterized by means for acknowledging the actuation of said remote control function.

7. A teleprinter remote control and data reporting system comprising:

a control station having means for transmitting and receiving teleprinter signals;

at least one outstation having means for transmitting and receiving teleprinter signals, said receiving means including means responsive to a selected teleprinter call character or opening said outstation to a command signal from said control station whenever said selected teleprinter call character is received by said outstation for a predetermined number of times in succession;

said transmitting means including means operative whenever said outstation is open for transmitting reporting data in teleprinter code to said control station in response to a report command teleprinter signal from said control station, report shift register means for commutating the report data from a plurality of data sources;

control means for said report shift register means;

means for producing a predetermined teleprinter character in parallel form whenever the binary value of the reporting data is "1" and a different predetermined teleprinter character whenever the binary value is "0";

transmitted signal shift register means for converting the parallel teleprinter character from said character-producing means into serial form for transmission over said communication channel; and control means for said transmitted signal shift register means; and a communication channel connecting said control station and said outstation.

8. The teleprinter remote control and data reporting system of claim 7 wherein said transmitting means further includes means for transmitting a predetermined teleprinter acknowledgment character whenever said selected teleprinter call character has been received by said outstation for said predetermined number of times in succession.

9. The system of claim 8 further characterized by means operative whenever said outstation is open for actuating a selected remote control function in response to a remote control teleprinter command signal from said control station.

10. The system of claim 9 further characterized by means for acknowledging receipt of said remote control command signal before said remote control function is actuated.

11. The system of claim 10 further characterized by means for acknowledging the actuation of said remote control function.